United States Patent Office 2,951,361
Patented Sept. 6, 1960

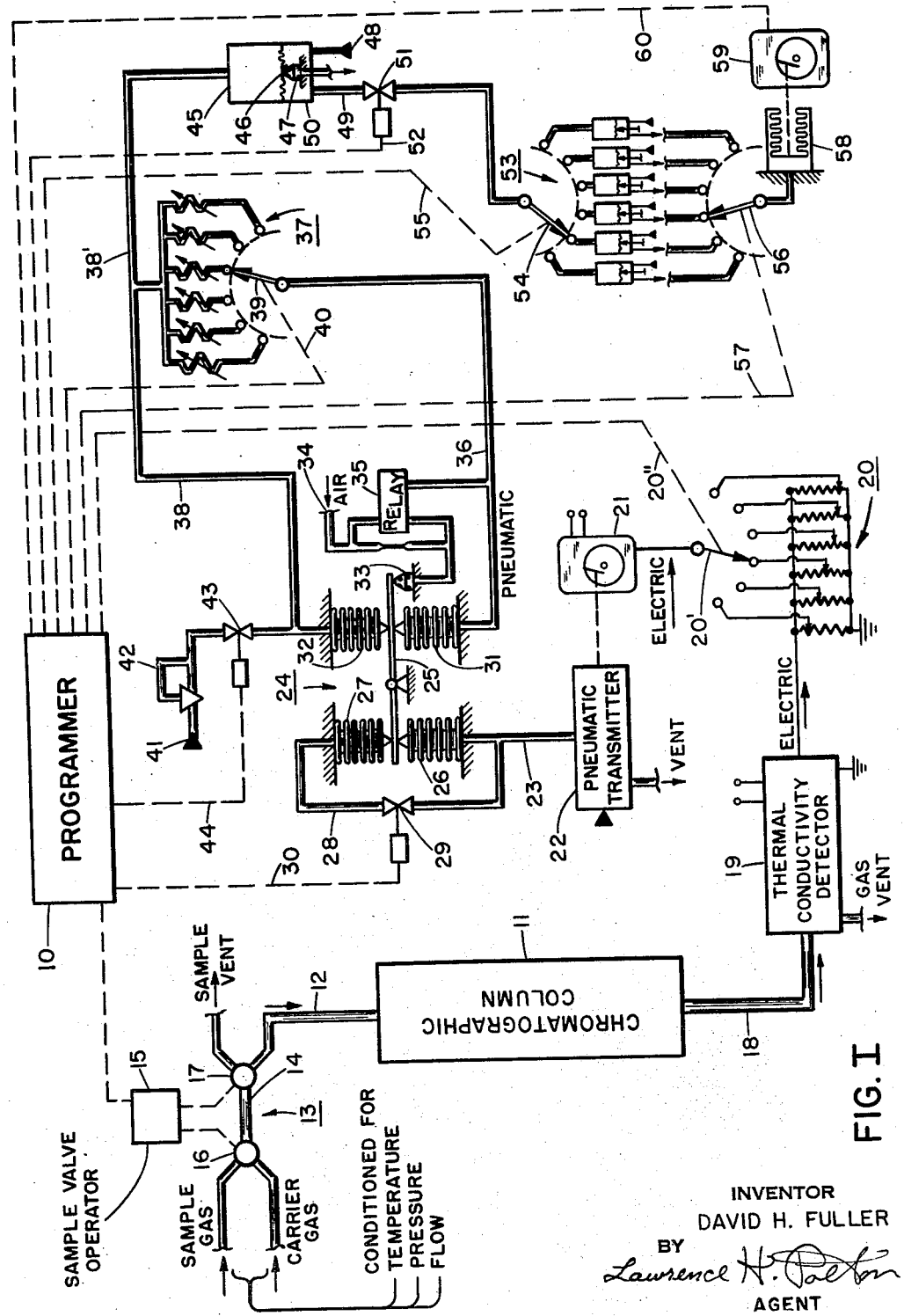

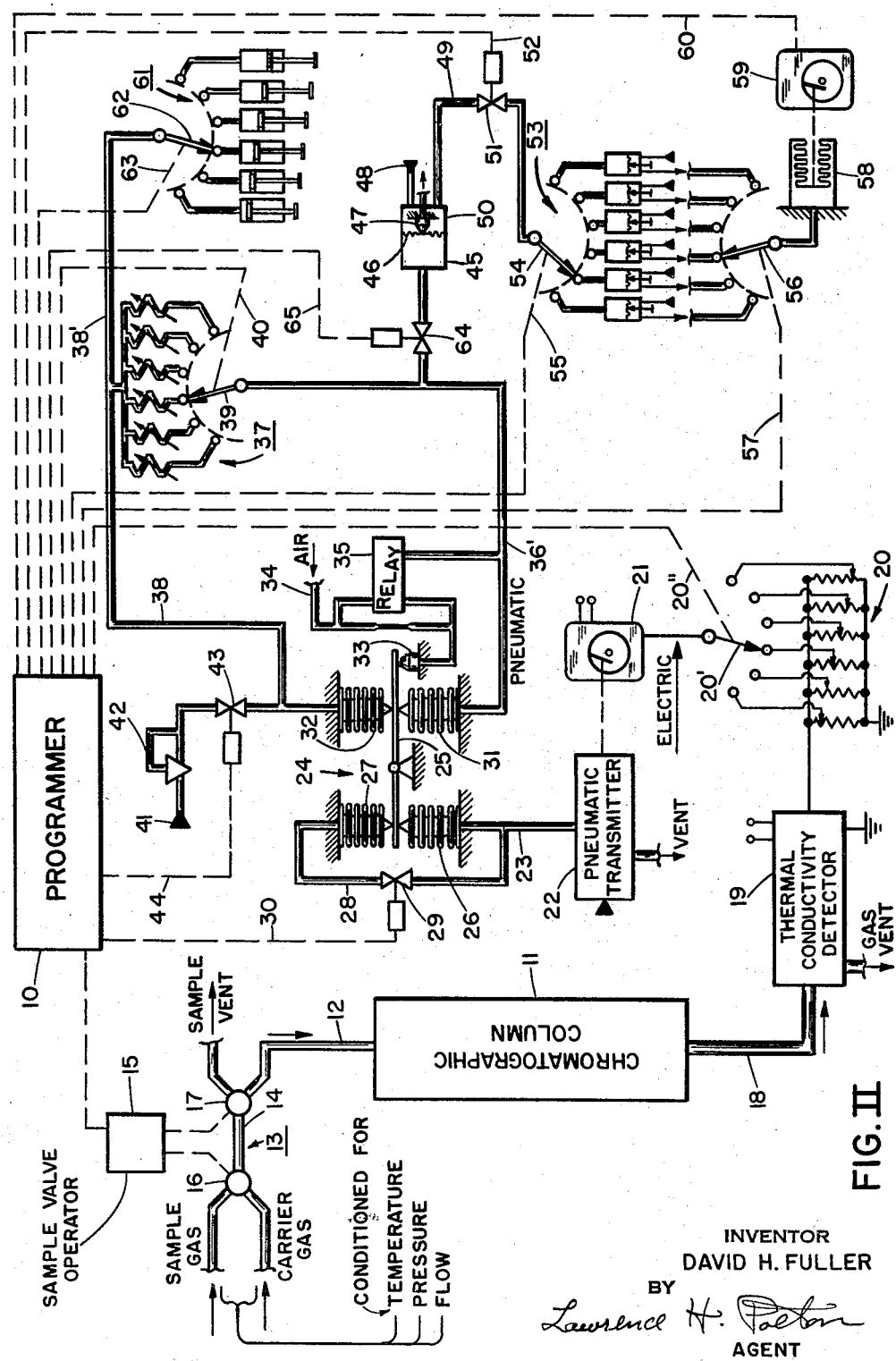

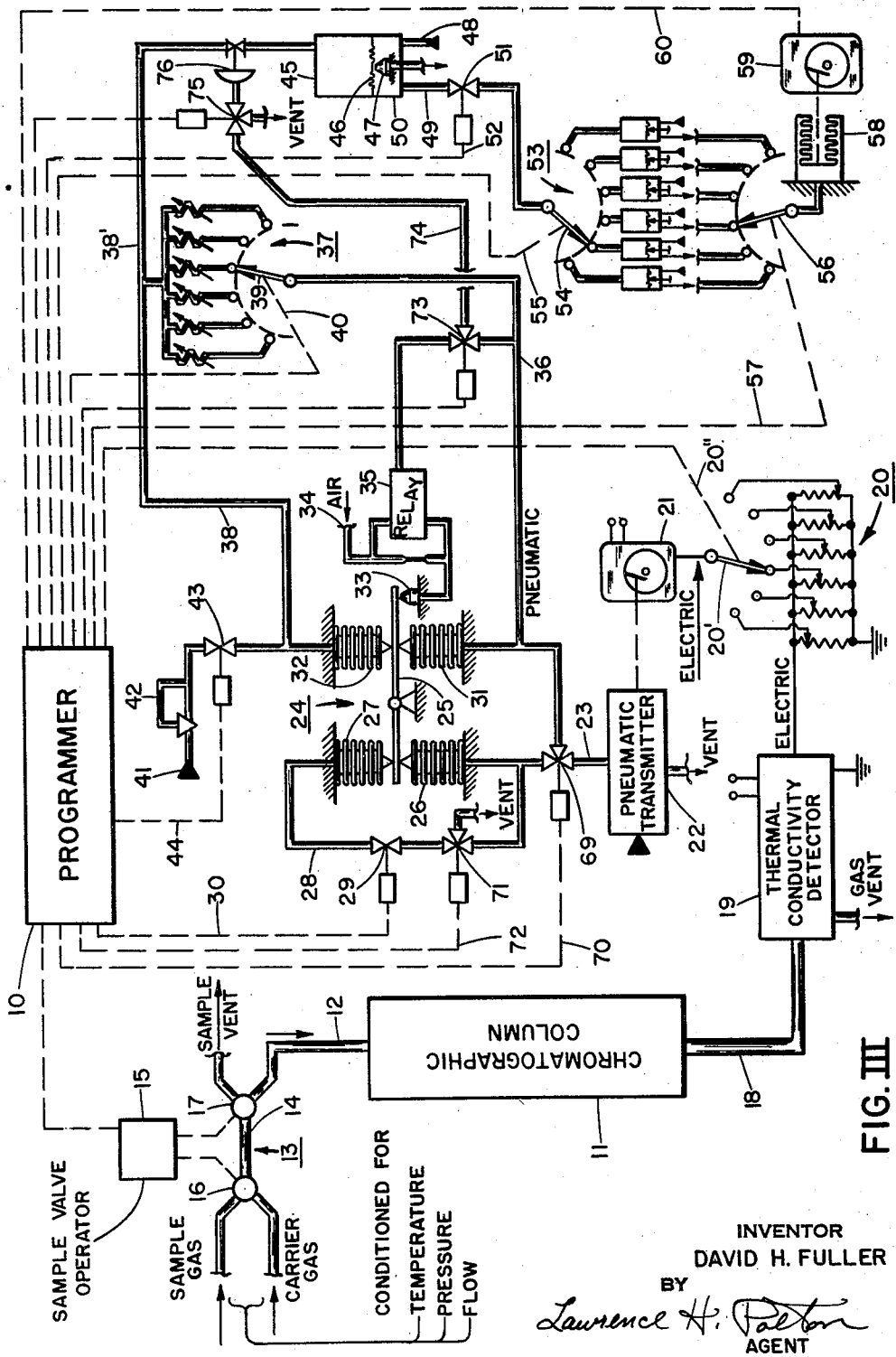

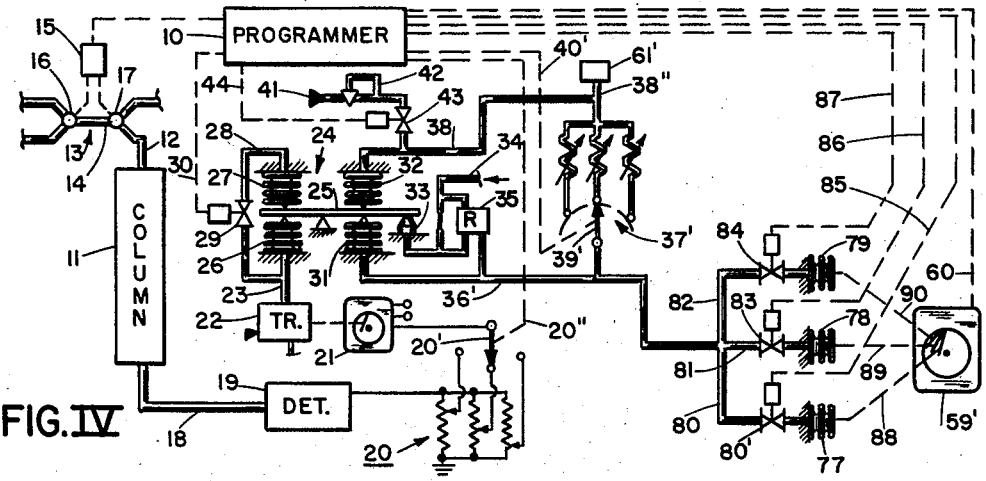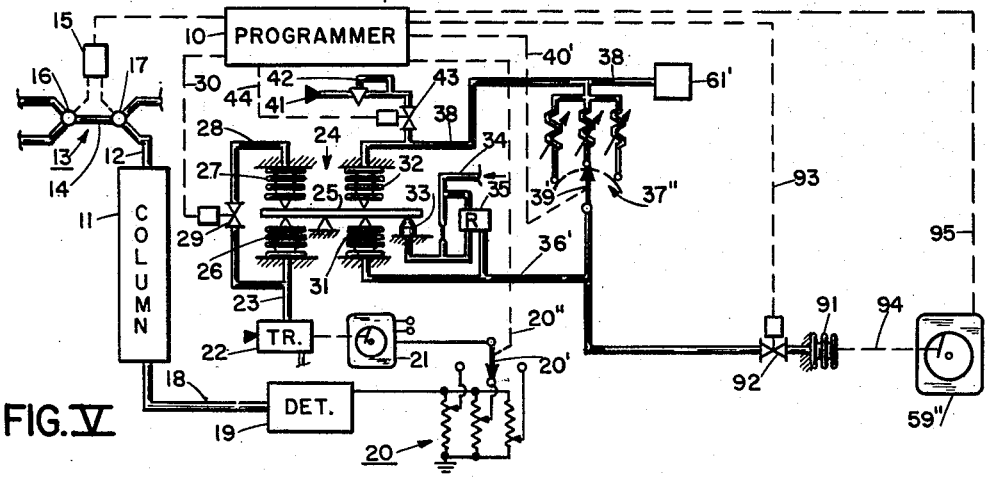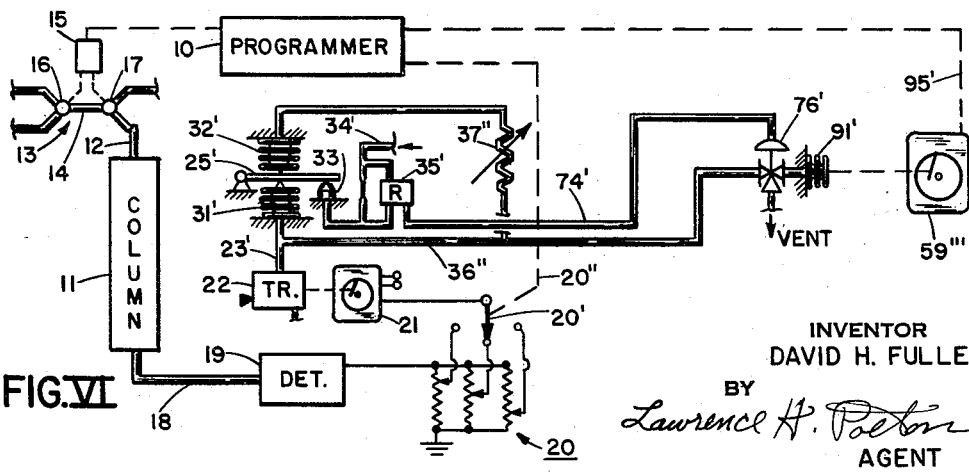

2,951,361

GAS CHROMATOGRAPHY ANALYSIS SYSTEM

David H. Fuller, Wrentham, Mass., assignor to The Foxboro Company, Foxboro, Mass., a corporation of Massachusetts Filed July 11, 1957, Ser. No. 671,341

2 Claims. (Cl. 73—23)

This invention relates to chromatographic analysis of gas samples with particular reference to plant stream analysis systems. A particular feature of this invention is the provision of a pneumatic chromatographic system, as set forth later herein.

Gas chromatographic analysis is the process of separating and measuring the components in a gaseous mixture by passing the mixture through a chromatographic column in a carrier stream of gas.

The word chromatography comes from early experiments using the principles of adsorption to separate coloring matter from leaves.

Through various intermediate steps the word chromatography is now applied, as in this invention, to component separation techniques in vapor phase gas analysis.

In the system of this invention, for example, a separation column packed with alumina may be used with a carrier stream of helium flowing therethrough as a means of quantitatively detecting gas sample components such as ethane, propane, iso-butane, and others.

Each component in a gaseous sample mixture has its own "affinity" for a given column material. Therefore, it will cling to that material for a time which is characteristic to it alone and to no other component. The time during which each component clings to the column material, before it is moved out by the carrier gas, is called its retention time. At a given temperature, flow rate and pressure, and with the same carrier gas and column, a component will always have the same retention time. Since each sample component has this unique "clingability" or retention coefficient under given conditions it will stay a longer or shorter time in the column than the other components in the gas sample mixture. Eventually all components in the mixture will be moved out of the column by the carrier gas, preferably, and by sample component and column material preselection, one by one. As each one emerges, a detector device such as a dual thermal conductivity cell may be used to measure its magnitude. The carrier gas is so selected in relation to the column packing material and other operating parameters that it passes through the column continuously without breaking up into separately clinging components. The output of the detector means is in wave form, each wave representing one component, and the quantity of the different sample components is taken to be represented by the area under its respective wave. This representation may be made by integration, peak height detection, or other like means.

The identity of each sample component is known by predetermination so that its location along the time axis is also known. Thus the initial and final arrival times of the component at the detector, as well as the peak time, are known and used in programming the system according to this invention. Accordingly the measurement accomplished by this system is one of quantity only, a percentage composition measurement.

The present invention is concerned with the provision of a pneumatic chromatographic analysis arrangement, with pneumatic system means at least for handling the output of whatever detector is used, so as to provide the advantages of pneumatic systems in signal analysis and in the operation of various devices in conjunction with the chromatographic analysis system.

Thus this analysis by chromatography consists of first separating the unknown gaseous sample mixture into its constituents and then quantitatively analyzing each constituent separately. As previously mentioned, this separation is on a time basis. Since the components are separated in the effluent (column output) the detector need handle only binary mixtures. Thus simple, non-specific detectors are suitable.

There are several types of column packings available. Some operate by adsorption of the gas directly onto "activated" particles. These may be, for example, particles of aluminum oxide, carbon or silicon, which have been made irregular and porous. Since different gases are differently held and released by any given surface (somewhat in accordance with their vapor pressures and hence boiling points), some pass through readily, and others are held back somewhat. Other packings utilize thin films of liquid in which different components have different solubility. Thus the liquid-vapor partition values vary between components with the same overall slowing down of some components compared to others. These are known as partition columns. Many so called partition columns have some characteristics of adsorption as well, due to the supporting solids used. Still other packings separate gas components on the basis of molecular size, slowing down larger (or heavier) molecules more than smaller (lighter) molecules. These provide the molecular seive type of column. Other characteristics such as ion-exchange are used. In general, each packing must act to retard the flow of different constituents to different degrees.

If a sample were merely introduced into one end of the column, it would pass through by simple diffusion. This slow process can be speeded up by introducing a more closely held component which pushes the component of interest through by displacement, or by introducing a neutral or very weakly held component, which speeds up diffusion by dragging the components through. This latter mode of operation is called elution and is commonly used. It flushes each component completely out of the column.

This invention, therefore, provides a pneumatic chromatographic analysis system wherein the output of the column and detector is handled in simple, accurate, dependable fashion; in such manner as to vary and adjust the signal as desired for best use thereof; in such manner as to relate the operation of the system to the operative characteristics of the various parts of the system and to the nature of the carrier and sample gases which are utilized; and in such manner as to make possible the storage of such signals for later readout purposes such as indicating, recording, controlling and the operation of associated systems and devices.

A particular feature of this invention is the provision of a pneumatic chromatographic system. This invention is concerned with plant stream analysis on a continuous basis as distinguished from prior art batch chromatographic systems and such a change-over requires attention to special considerations which are not present in batch systems, mainly means for continuous analysis of the results produced in a chromatographic column. In view of the prior batch operations the ordinary and usual development into a continuous flow operating arrangement would involve complicated and expensive and unstable electrical and/or electronic systems and arrangements. In order to produce the accurate and dependable results required under present day large volume production such electrical and/or electronic systems would necessarily be very involved, expensive, and extensive.

This invention, on the other hand, provides a combination whereby the advantages of a simple pneumatic system are provided in chromatographic analysis. This makes the laboratory to plant stream change-over relatively simple, and provides automatic sampling on a continuous basis with a built-in ruggedness which is adaptable to the various difficult environments to which such systems are subject and makes them readably operable even by unskilled personnel. A further advantage of applicant's pneumatic chromatographic system is long life repeatability with respect to its initial accuracy. Further, in the system of this invention, there is a minimum of complicated circuitry and mechanics, with the result that the system of this invention provides reliability, ease of use and servicing, and interchangeability of components, as well as similarity from the standpoint of operation service with respect to other plant instruments to which available personnel are already accustomed. This invention, therefore, provides simplicity as a large factor, with strong factors of speed, dependability, accuracy and repeatability.

It is, accordingly, an object of this invention to provide an improved chromatographic gas analysis system.

Other objects and advantages of this invention will be in part apparent and in part pointed out hereinafter.

In the drawings:

Figure I is a schematic illustration of a chromatographic analysis system according to this invention, with a pneumatic integrator system having one form of output takeoff;

Figure II is a schematic illustration of another form of chromatographic analysis system according to this invention wherein a pneumatic integrator is provided with another form of output takeoff;

Figure III is another form of chromatographic analysis system according to this invention, this system being similar to that of Figure I and including valving and connection means for transforming this system into a pneumatic peak detector system involving mutual use of several elements;

Figure IV is another form of pneumatic integrator chromatographic analysis system according to this invention, with several direct, individual output arrangements;

Figure V is a further form of pneumatic integrator chromatographic analysis system according to this invention, with a single direct output arrangement to handle the several signals of a particular sample measurement; and Figure VI is a pneumatic peak detection chromatographic analysis system according to this invention.

Referring to Figure I, the illustrative embodiment of this invention shown therein includes, in the central upper portion of the drawing, a programmer unit 10. This programmer unit is made up in a suitable way with cams and switches or stepping relays or the like (not shown) operatively arranged on a time basis according to the expected sample. The various operations of the programmer are indicated by dotted lines representing mechanical, electrical, pneumatic, or other suitable connections and extending from the programmer 10 to the various portions of the analysis system, as shown in the drawing, and as described later herein.

The programming arrangements are indicative of an important feature of this invention in that their operation relates the operation of the various components of the overall system, on a time basis, to the occurrence of the various component signals throughout the system. This may be done on a prescheduled basis in accordance with the known action of the various components and in accordance with the operational characteristics of the various components of the overall system. This is the arrangement indicated in the drawings as shown by the programmer and the connecting lines thereto. On another basis, the action of the signals themselves may be used to actuate the programmer through the use of suitable signal sensing and programmer actuating devices (not shown)

In Figure I, at the left of the drawing, is shown a chromatographic adsorption column 11 containing, for example, activated alumina. A gas input pipe 12 leads to the column from a sampling switch arrangement 13 which comprises a carrier gas line and a sample gas mixture line selectively fed into a common sampling pipe 14, from which there is one output through the column input pipe 12 and one output to vent. A sampling valve operator 15, which may be a solenoid as actuated by the programmer 10, operates sampling valves 16 and 17 simultaneously to either apply carrier gas to the column or to first admit a supply of sample gas to the sample pipe 14 and then to carry this sample into the column by means of the carrier gas.

The output of the column 11 is by way of pipe 18 to a thermal conductivity detector 19 which may be any of the usual Wheatstone bridge type of thermal conductivity detectors (sometimes called Katharometers), as one form of a detector which may be used in this system.

The output of the thermal conductivity detector 19 is an electrical signal representing the quantitative value of a component of the sample gas, that is, the percentage composition of the particular sample component which is being passed through the detector at a particular time. This detector output signal is applied through one of a bank of electrical resistors 20 to a suitable conventional electrical recorder 21. The bank of resistors 20 comprises a group of adjustable electrical resistances, only one of which is used at a time. These various resistances are used as means of modifying the span of the output signal of the thermal conductivity cell 19 in such a way as to provide a full scale reading of the electrical recorder 21 for the maximum expected concentration of each of the expected components. These modifications relate to the actions of the particular components in passing through the column and the detector, and have to do with the kind of column, the kind of gas, its retention time in the column, its response characteristics with respect to the detector, e.g., its thermal conductivity factor, and other such matters, as well as to its percentage composition. Thus each of the resistors of the resistor bank 20, with respect to one of the expected sample gas components, has been adjusted with all signal varying factors including the percentage concentration factor, taken into account. As a result of these adjustments, the maximum possible expected concentration of any one component results in a full scale reading in the recorder 21. The recorder 21 converts the signal to a pneumatic signal through a standard pneumatic transmitter 22, such as a conventional supply and waste nozzle-baffle type of transmitter. Thereafter, the pneumatic signal output of the transmitter 22 is taken through a pneumatic pipe 23 and applied to a pneumatic integrator system indicated generally at 24.

With respect to the resistor bank 20 in the output of the thermal conductivity detector 19, a selector switch 20' is provided for stepping from one to another of these various resistances in accordance with the expected component in its time arrangement according to its nature in the sample, and as scheduled from the programmer 10 through an operating connection 20''.

The pneumatic integrator 24 in this form of illustration of this invention, is essentially a force balance system operating about a balance bar 25 which is pivoted essentially midway of its length. At the left side of the pivot of the balance bar, as seen in Figure I, is a signal input bellows 26 to which the pneumatic signal is applied from the pneumatic transmitter 22 through the output pipe 23. In opposition to and matched with the input signal bellows 26, a zero set bellows 27 is applied to the balance arm 25. A connection pipe 28 is provided between the input signal bellows 26 and the zero set bellows 27 as a means of providing a programmed, pre-measurement step of balancing the integrator system to zero. This action is produced by operating the shut-off valve 29 from the programmer 10 through an operating connection 30. During the actual signal measurement operation of the integrator, the pipe 28 is closed off by the valve 29 as actuated by the programmer.

Again as seen in Figure I, on the right hand side of the pivot of the balance arm 25, a second pair of opposed and matched bellows is provided, one being a proportional bellows 31 which opposes the input signal bellows 26 and the other a reset bellows 32 which operates in aid of the input signal bellows 26. The matching of the bellows is primarily a matter of bellows selection and may be aided by a suitable moment arm adjustment (not shown) if desired.

The balance arm 25 acts as a baffle with respect to a pneumatic bleed nozzle 33 which is supplied with air from a source 34 and which operates when restricted by the balance arm to apply a nozzle back pressure to a pneumatic relay 35 in the usual pneumatic nozzle-baffle arrangement. The output of the pneumatic relay representing the back pressure of the nozzle 33, is applied directly to the proportioning bellows 31, and indirectly to the reset bellows 32 by way of a connection pipe 36, a pneumatic resistor bank 37 and a connector pipe 38. The pneumatic resistors in the bank 37 are arranged to be used one at a time. This is accomplished by means of a selector switch 39 operated from the programmer 10 through connection 40. The dotted line partial disc showing of the switch 39 indicates that at any one switch position, all but one of the pneumatic resistors are closed off. This arrangement of programmed selectivity of pneumatic bleed resistors between the proportioning and reset bellows 31 and 32 functions to selectively modify the output of the integrator to provide full scale output of the integrator at a selected value of concentration for each component.

In the programmed operation of the integrator, the previously mentioned zero adjustment is first made with respect to the input signal bellows 26 and the zero set bellows 27 by opening the zero set valve 29. Thereafter, during the measurement action, this valve is closed. The integrator system is then set at a balance by establishing a pre-selected minimum pressure in the reset bellows 32 from a pneumatic source 41 through a regulator 42 and by means of a valve 43 which is controlled from the programmer 10 through a connection 44, and by thereafter achieving a matching pressure in the proportioning bellows 31 by bleeding through the pneumatic resistor bank 37 and by the nozzle back pressure action of the nozzle-baffle arrangement. Equal pressures are thus established in the bellows 31 and 32. With the integrator system thus at a balance the input signal is applied to the input bellows 26, with the result that there is a tendency to cover the nozzle 33 with the balance bar 25 as a baffle, and the back pressure from the nozzle 33 is then applied, through the relay 35, first to the proportional bellows 31 in a tendency to balance the system and then more slowly through the programmer selected one of the pneumatic resistors in the resistor bank 37, to the reset bellows 32, which opposes the establishment of a balance in the force balance system, that is, it operates in aid of the input signal bellows 26 at a rate and for a time period depending upon the magnitude of the input signal.

The output signal taken from the reset bellows 32 at any time is the integrated representation of the area under the input signal curve of a particular component up to that time. Accordingly, an output signal taken at the time of natural completion of a particular component wave is a representation of the total area under the curve of that wave and is a precise measure of the particular concentration of that component which is under consideration at the moment. Other measures, such as peak detection are exact measures as to some point, such as the peak, and are used as the basis of estimates with respect to the total area under the component curves, such estimates being sufficiently accurate in some situations.

In considering the structure of Figure I, therefore, with the set valve 43 closed, increasing pressure in the input signal bellows 26 (representing the presence of a sample component of interest) tends to close the nozzle 33, thus applying increasing pressure through the relay 35 to the proportioning bellows 31. Accordingly, the pressure change in the proportioning bellows is directly proportional to that in the element bellows. This proportioning bellows pressure bleeds through the selected pneumatic resistor in the restrictor bank 37 into the reset bellows 32 (and the repeater tank 45) at a rate depending on the signal strength, the resistance of the restrictor and the capacity of the bellows and computer tank. The increasing pressure in the reset bellows 32 tends to close the nozzle 33, thus raising the pressure in the proportional bellows 31 and maintaining a difference in pressure proportional to the signal from the pneumatic transmitter. Since the differential pressure across the restrictor (in the bank 37) remains proportional to the pneumatic transmitter signal and, thus, to the value to be integrated, the rate of pressure build-up in the reset system remains, likewise, proportional. Thus, the pressure in the reset bellows 32 is a product of this rate times the existence time of the signal and is, therefore, an exact measure of the integral of the pneumatic transmitter signal. Whenever that signal returns to its original value, the pressure difference between the input bellows 26 and the zeroing bellows 27 disappears and the reset and proportional bellows 32 and 31, and the repeater tank 45 are all at the same final pressure which is an exact measure of the integral of the signal curve. The readout valve 51 is then opened to permit the selected memory tank to come to the same pressure as the repeater tank 45. The readout valve 51 is thereafter closed, and the re-zero valve 43 opened to restore the pressure in the reset bellows 32 and the repeater tank 45 to the original value (for example, 3 p.s.i.g.). The proportional bellows 31, likewise, goes to this same base value due to control action involving the nozzle 33. It should be noted that alternatively, the readout may be made from the proportional side (see Figure II) i.e., bellows 31, since the two pressures, at readout, bellows 31 and bellows 32, can be made to be the same. To insure this pressure sameness, prior to readout from the proportional side, it is necessary to open the by-pass valve 29 between the input signal and the zeroing bellows so that their pressure differential is assured to be zero. A take-off from the reset bellows 32 does not require this input zeroing step since the reset pressure is at all times the integral of the input signal.

In the Figure I structure, the output signal from the reset bellows 32 is connected to a pneumatic repeater tank 45 by means of the connector pipes 38 and 38'. The tank 45 acts as part of the capacity of the resistance-capacity pneumatic system involving the reset bellows 32 and the particular selected pneumatic resistor from the pneumatic resistor bank 37, this resistance-capacity combination comprising the time delay factor which established the previously mentioned modification of the integrator output signal.

As each component applies its signal to the repeater tank 45, it is desirable to read-out this signal and make way for the next component signal from the same gas sample. This is accomplished by means of a pneumatic repeater construction which operates without loss of signal in the pneumatic repeater tank 45. The tank is provided with a transverse flexible diaphragm wall 46 as its bottom and this wall is moved up and down in a vent restriction variation action with respect to a vent (to atmosphere) nozzle 47, in response to any difference in pressure between repeater tank 45 and a repeater chamber 50 which has the diaphragm 46 as its upper wall and which contains the vent nozzle 47. This arrangement divides a pneumatic flow through chamber 50 from a suitably restricted source 48, between an output pipe 49 and the vent nozzle 47, so as to maintain a pressure in chamber 50 always equal to the pressure signal in the repeater tank 45 irrespective of the flow demand in the output 49, for example, by a read-out device connected to output 49. A valve 51 is provided in the output pipe 49 and is operated from the programmer 10 through an operating connection 52. Thus according to a predetermined programming arrangement, the signal from a particular component is read out of the computer tank 45 by opening the valve 51. The pneumatic signal as thus read out is thereupon stored in one of a series of pneumatic storage tanks 53, according to a programmed selection made by a selector switch 54 as operated from the programmer 10 according to the particular timing arrangement desired, through a connection 55. Each of the tanks in the storage group 53 is a repeater tank like the repeater tank 45 in that it is a dead-end tank with a pneumatic no-signal loss repeater nozzle vent arrangement, shown schematically. As indicated by the dotted partial disc about the selector switch 54, all but one of the storage tanks 53 are closed off by the switch 54, at any one station of the switch. Thus the signals may be stored, one in each storage tank (53), each representative of one component of the particular gas sample involved. Having established, for example, a first gas mixture sample with six components of interest as having six particular component percentage concentration values, then through a pneumatic readout switch 56 as operated from the programmer 10 through a connection 57 according to a predetermined schedule, the various six signals from one particular gas sample may be read out in turn in a scanning action which may be repetitive if desired, and fed to a pneumatic transducer 58 which applies each signal to a recorder 59 which may then record the signals with one pen, or six, as desired and according to suitable conventional mechanism. The dotted partial disc about the switch 56 indicates that only one storage tank output is open at any one readout station. The recorder 59 may be scheduled in its operation from the programmer 10 through a connection 60, if desired. Components not of interest may be excluded by programming to prevent readout at particular times. Overlapping signals may be avoided by sample treatment or may be measured by peak detection or partial area measurements.

Accordingly, if the gas sample which originated in the sampling valve pipe 14 contained six components of interest then these various six components will have been passed through the entire analysis system as modified by the bank of electrical resistors 20 and the bank of pneumatic resistors 37 and as integrated by the pneumatic integrator system 24 and applied to the bank of six storage tanks 53 and thereafter read out under a predetermined schedule by the readout switch 56 and applied to a recorder 59, and established as six separate records in the recorder in any suitable fashion for reading and comparing such signals. In this manner, an entire sample comprising several components may be automatically and continuously analyzed in the sense of a rapid batch sampling arrangement. The automatic programming, by opening valve 43 to connect the integrator system to the pneumatic source 41 and the regulator 42, will then readjust the pressures in the integrator system to their initial balance values and will thereafter operate the sample valve 15 again so that the operation of the entire system is a continuous analysis in the sense of repeated batches automatically applied to the system according to a predetermined programmed schedule. The readout pressures in the tanks 53 are individually readjusted at each new signal through the action of the chamber (50) system.

Figure II represents a variation of the structure of Figure I with much of the system being the same. The difference lies in the pneumatic integrator 24. It will be noted in the Figure II system that the output is taken from the proportioning bellows 31 instead of from the reset bellows 32 as in Figure I. Thus the Figure II output signal is applied to the pressure repeater tank 45 through a connector pipe 36′ and a valve 64 as operated from the programmer 10 through a connection 65 in accordance with the predetermined schedule of the arrival and build-up of the various components of the gas sample. The readout arrangement from the repeater tank 45 to the various storage tanks is the same as in Figure I and the readout from the storage tanks 53 to the recorder 59 is also the same as in Figure I. The same reference numbers or their primes have been applied to like elements in Figures I and II. Note that in this system the zeroing valve 29 is operated just prior to readout.

It will be noted in Figure II, with respect to the reset bellows 32, that the connection between the proportioning bellows and the reset bellows 32 is through the bank of pneumatic resistors 37 in conjunction with a bank of pneumatic capacitors 61. The capacitors are chosen through a selector switch 62 operated from the programmer 10 through a connection 63 in conjunction with the selection of the particular pneumatic resistors 37 by switch 39 in the same manner as in Figure I. Thus only one capacity tank is in the system at any one time. In this fashion with respect to Figure II, a series of different resistor-capacity combinations is provided for a selection wherein the capacity can be changed as well as the pneumatic resistance. This arrangement makes possible different adjustments with respect to linearity as applied to characteristics of particular components. The various capacitors in the bank 61 of Figure II are adjustable as to capacity as schematically indicated. This aids in varying the time constant factor of the integrator system to adjust the rate in the combination of rate times time which is the measuring action of the integrator in establishing the area under the component curve in representation of the quantitative value of a particular component, that is, its percentage composition with respect to the gas sample under test.

The Figure III embodiment of this invention includes as a part thereof the entire system of Figure I operable in the same manner and having the same function as the structure of Figure I and consequently being provided in its various elements with the same reference numbers. However, Figure III is a total combination which is much more than the system of Figure I in that it is a combination system which may be programmed to provide both pneumatic integration and pneumatic peak detection, although at different times, in accordance with the desired action with respect to the gas sample under test.

It may be desirable in a single sample of gas to measure one element with the integrator and the other remaining elements by means of the peak detector for purposes of rapid scanning for example, or for example, because of overlapping of the waves from successive components. This joint action may be accomplished by the use of a single column and by the use of suitable valving and switching connections in the various arrangements of Figure III as will be described hereinafter. Thus the combination system of Figure III provides means for meeting a wide variety of needs in gas chromatography, and analysis either on a fast batch process arrangement or a continuous process arrangement in the sense of automatically repeated sampling according to a predetermined schedule.

Figure III system is provided with various means for automatically changing the system from that of pneumatic integration to one of peak detection. The elements thereof are as follows: Starting at the input to the pneumatic system, that is, at the pneumatic transmitter 22, a three-way valve 69 is provided in the signal input pipe 23 as a means of shifting the input signal from the bellows 26 to the bellows 31. This valve is operated from the programmer 10 through a connection 70. When the shift-over from pneumatic integration to peak detection is made, the by-pass valve 29 between the bellows 26 and 27 is opened and left open to equalize and thus neutralize the pressures in these bellows. Further, another valve, 71, is provided in the by-pass pipe 28, this valve being operated from the programmer 10 through connection 72 and constructed as a means of simultaneously venting to atmosphere both the bellows 26 and 27. In effect, therefore, when the shift-over is made from the pneumatic integration to peak detection the bellows 26 and 27 are removed from effective participation in the action of the force balance device.

A further change-over element in the shift from pneumatic integration to pneumatic peak detection in Figure III is in the output of the nozzle back pressure relay 35. A valve 73 is provided for shifting the output of the relay 35 from its connection to pipe 36 to a new pipe 74. This pipe 74 leads through a vent valve 75 to another new valve 76 in the line 38' from the bellows 32 to the capacity tank 45.

In the shift-over from pneumatic integration to peak detection therefore, the valve 29 is opened and the vent valve 71 is also opened to equalize and vent the bellows 26 and 27 to atmosphere. At the same time, the valve 69 is operated to shift the input pneumatic signal from the bellows 26 to the bellows 31. Further, the valve 73 is operated to shift the output of the relay 35 from the pipeline 36 to the new valve 76. The vent of valve 75 is closed while the signal is built up, and the relay 35 is connected to the valve 76. However, the signal during this build up is insufficient to close the valve 76 which is normally open during the operation of the peak detector system up to the point where the peak is actually detected. As a further step in the operation of the peak detector system the supply valve 43 to the bellows 32 is closed during the operation of the peak detector system.

The operation of the peak detection system is as follows: The signal which is applied to the peak detector from the pneumatic transmitter 22 to the bellows 31 is in the form of a growing pneumatic signal which rises to a peak and then drops off. By detecting the quantitative value of this signal at its peak a determination is made which is a sufficient approximation for some purposes as a representation of the percentage composition of the gas sample component which is being measured. Thus in the operation of the peak detector the signal is applied to the bellows 31 as a rising pneumatic signal which tends to hold the balance arm 25 away from the nozzle 33 so that there is effectively no back nozzle pressure during the rise of this signal and in consequence the valve 76 remains open. The input rising signal is also applied to a selected one of the bank of pneumatic resistors 37 through the pipe 36. This resistor is selected or adjusted to be a relatively low value resistor so that there will be a pressure drop between the bellows 31 and 32 but it will be relatively small and the pressure in the bellows 32 will closely follow in time the pressure in the bellows 31. Thus the peak detection input signal is applied to the bellows 32 through the selected resistor in the bank 37 and is also applied in a building up fashion to the capacity tank 45 since the valve 76 is open during the build up period. When the peak of the signal is reached, the pressure in the bellows 32 quickly catches up with the pressure of the bellows 31 and the nozzle 33 is again covered at least to a predetermined degree thus providing a back pressure through the relay 35 to the valve 76. This pressure operates the valve 75 to trap the signal which has been building up, and the peak pressure is locked into the capacity tank 45. The pressure in the tank 45 thus represents the percentage composition of a particular sample component.

In order to clear the system for a new signal the programmer is arranged with respect to the expected time of arrival and departure of the various peaks of the various components of the gas sample so that the valve 75 is operated so as to vent the pressure in the line 74 and valve 76 to atmosphere, thus allowing the valve 76 to reopen, and thus setting up the system to a new signal. The valve 75 is a three-way valve, normally open so that whatever back pressure there is from the nozzle 33 is applied to the valve 76, and normally closed as to vent.

In all of the systems Figure I, II, III, the switching arrangement of the storage tanks 53, that is, the switch unit 54, is arranged by the programmer to be operated one step behind the other selector devices, that is, the pneumatic resistor bank 37, 37', the Figure II variable capacity bank 61, and the electrical resistor bank 20, as a bumpless transfer arrangement. In this manner each signal is built up throughout the system without the build up fluctuation appearing in the storage tanks 53. Just prior to readout operation of the readout selector 56, the storage tank selector 54 is moved to the station about to be read out. It may be noted that, as viewed in the drawings, the various selector and readout arms operate counterclockwise.

The structures of Figures IV, V and VI are simplified versions of the chromatographic pneumatic system according to this invention for application to particular measuring situations. The integrator systems of Figures IV and V are similar to the system of Figure II in that the output is taken from the proportional bellows and the peak detector system of Figure VI is like that shown in the combination of Figure III. The Figure IV and V structures have many like elements with respect to each other and with respect to the structure of Figure II and in such cases the same reference numerals or their primes appear in Figures II, IV and V. Similarly with respect to Figures VI and III, the like elements are provided with the same reference numerals or their primes.

The structure of Figure IV differs from that of Figure II in that the system is arranged for the measurement of three components of any one sample as indicated by the three resistors in the electrical resistor bank 20' and the three pneumatic resistors in the pneumatic resistor bank 37". This is to indicate the possibility of use of a device of this nature in a simplified specific application structure wherein the knowledge of the quantitative value of three components of the sample is desired and to indicate that structures may be specifically designed for various such numbers of sample components as desired. The structure illustrated in Figure IV has a further feature in that the output signal from the integrator through the pipe 36' is applied on the basis of individual components to individual output bellows as shown at 77, 78, and 79. This arrangement is effectuated by separated output take-off pipes 80, 81 and 82, with solenoid operated valves therein respectively at 80', 83 and 84, and with these valves operated according to a predetermined schedule from the programmer 10 by means of connections as indicated by dotted lines 85, 86 and 87. Further, the individual bellows 77, 78 and 79 are provided with individual output take-off means 88, 89 and 90 which apply individually to individual pens in the recorder 59'. The recorder 59' may be especially programmed in its operation with respect to the application of the individual signals, if desired, through the programmer connection 60. Thus with the structure of Figure IV the individual components of a single sample may be measured and integrated with the output signal of each applied to a separate bellows with a separate connection to an individual recorder pen. In this instance the recorder and the multiple pen individual operation arrangement is illustrative and the output of the individual bellows 77, 78, and 79 may be applied to other operations or controls individually or in associated partial or complete concert as desired.

The Figure V integrator system is the same as the system of Figure IV except for the output and the programming arrangement. The output pipe 36' in the Figure V structure is led to a single output bellows 91 with a shut off valve 92 in the output pipe 36' and is solenoid operated from the programmer 10 by an operating connection 93. The output bellows 91 is indicated as having a single take-off connection 94 which leads to a single pen in the recorder 59". On this basis and with this structure the different components of a gaseous mixture sample are measured, integrated, and applied to the bellows 91, separately and individually as an output signal. Thus with the recorder 59" suitably scheduled from the programmer 10 through an operating connection 95, as each output signal comes from the integrator, representing a single component of the sample, it is read out by opening the valve 92 and allowing the bellows 91 to receive the signal and to apply it to the recorder 59". This additional capacity in the output line is effectively immediately adjusted for in the integrator since it slightly affects the back pressure of the nozzle 33. The system quickly readjusts itself so that the output signal in the bellows 91 is a correct one and it is read out into the recorder 59". Thereafter the valve 92, according to the established program, is shut. The next component signal is then measured and integrated and applied to the output of the integrator. Then the valve 92 is again opened and the new signal applied to the bellows 91 by equalizing adjustment involving a bleed either from the relay 35 or the nozzle 33, or both, as necessary to bring the bellows 91 to the new pressure. Thereafter the new pressure is applied to the recorder 59" as a new signal from a new component, with the chart of the recorder 59" suitably programmed and operated to receive it.

The Figure VI structure, as mentioned hereinbefore, is a chromatographic analysis peak detector combination which is an individual showing of the peak detector portion of the combination of Figure III. This peak detector system operates, as does the peak detector system of the structure of Figure III, when Figure III is arranged and adjusted for peak detection. The output of the structure of Figure VI however, is like the output of the integrator structure of Figure V in that it is a repeated individual output signal arrangement according to the program schedule, which immediately applies and immediately reads out each signal from each component with respect to the recorder 59''' and the programmer operating connection 95'. That is, for each component signal the valve 76' is operated to terminate the build up of the signal in the bellows 91' and to indicate the peak of the measured signal in the recorder 59'''. When the output of the peak detector goes to zero after a reading, the bellows 31' and 32' automatically equalize at the zero minimum pressure. On this basis, the back pressure from the nozzle 33' is reduced so that the valve 76' is again opened and the output bellows 91' is again placed in the peak detector system in preparation for a new signal from a new component.

As the signal from the new component builds up, the signal also builds up in the bellows 91' to the point of shut off. This is accomplished by the action of the peak detector in closing off the nozzle 33' as the signal passes over its peak. The signal in the bellows 32' catches up with that in the bellows 31'. Thus this peak detector system operates continuously for as many of the components to be measured as are desired and preselected. It should be noted with respect to the peak detection of Figure VI in reference to the peak detection system of Figure III that the output is taken from different bellows and a different system. This is a matter of convenience in the operation of the system since the bellows pressure at the time of the peak of the measured curve is, for practical purposes, identical in the bellows 32' and the bellows 31' since the by-pass pneumatic resistor or the bleed pneumatic resistor 37''' is of a low value resistance. The operation of the peak detector is effectively instantaneous with the downward turn of the curve of the measured variable. That is, the pressure in the bellows 32' follows the pressure in the bellows 31' closely and almost instantaneously.

This invention, therefore, provides a new and useful chromatographic pneumatic gas analysis system.

As many embodiments may be made of the above invention, and as changes may be made in the embodiments set forth above, without departing from the scope of the invention, it is to be understood that all matter hereinbefore set forth or shown in the accompanying drawings is to be interpreted as illustrative only and not in a limiting sense.

I claim:

1. A chromatographic instrument system comprising, in combination, a gas analysis system comprising a chromatographic column, means for passing a stream of carrier gas through said column, gas sampling means for injecting a predetermined amount of sample gas into said carrier gas stream as a means of applying said sample gas to said column, thermal conductivity means for detecting the quantitative values of preselected components of said sample in the output of said column, a series of detector signal modifying electrical resistance elements for use in the output of said detector with means for selectively applying said resistance elements to said detector output, a recorder operable by said detector output as modified, a pneumatic transmitter operated by said operation of said recorder, a pneumatic integrator system operable in response to the output of said detection means for producing output pneumatic signals in representation of preselected quantitative characteristics of said components, said pneumatic integrator system comprising a balance arm, an input signal bellows and a zero set bellows applied to said arm in opposition to each other and on the same side of the pivot of said balance arm, a closable pneumatic connection between said input bellows and said zero set balance, a proportioning bellows and a reset bellows applied to said arm in opposition to each other and both on the other side of the pivot of said balance arm, a pneumatic nozzle system operable with respect to said balance arm as a baffle therefor, and a pneumatic bleed connection between said proportional and reset bellows, wherein said pneumatic signals are produced in said reset bellows, and wherein the back pressure of said nozzle is applied to said proportional bellows, a group of pneumatic resistances and means for periodically connecting each of said resistances as the said pneumatic bleed connection, a repeater capacity tank pneumatically connected to said reset bellows, a group of storage chambers, pneumatic connection means between said repeater tank and each of said storage chambers, means for automatically selectively transferring said pneumatic signals from said repeater tank to said storage chambers through said last named pneumatic connection, repeater means operatively connected with each of said storage chambers for producing, without signal loss in said chambers, output signals available for output operative action, and a programming system for automatically operating said gas analysis system according to a predetermined schedule.

2. A chromatographic instrument system comprising, in combination, a gas analysis system comprising a chromatographic column, means for passing a stream of carrier gas through said column, gas sampling means for injecting a predetermined amount of sample gas into said carrier gas stream as a means of applying said sample gas to said column, thermal conductivity means for detecting the quantitative values of preselected components of said sample in the output of said column, a series of detector signal modifying electrical resistance elements for use in the output of said detector with means for selectively applying said resistance elements to said detector output, a recorder operable by said detector output as modified, a pneumatic transmitter operated by said operation of said recorder, a pneumatic integrator system operable in response to the output of said detection means for producing output pneumatic signals in representation of preselected quantitative characteristics of said components, said pneumatic integrator system comprising a balance arm, an input signal bellows and a zero set bellows applied to said arm in opposition to each other and on the same side of the pivot of said balance arm, a closable pneumatic connection between said input bellows and said zero set balance, a proportioning bellows and a reset bellows applied to said arm in opposition to each other and both on the other side of the pivot of said balance arm, a pneumatic nozzle system operable with respect to said balance arm as a baffle therefor, and a pneumatic bleed connection between said proportional and reset bellows, wherein said pneumatic signals are produced in said reset bellows, and wherein the back pressure of said nozzle is applied to said proportional bellows, a group of pneumatic resistances and means for periodically connecting each of said resistances as the said pneumatic bleed connection, a repeater capacity tank pneumatically connected to said reset bellows, and means for establishing a pneumatic peak detector system by utilizing portions of said integrator system, said means comprising a vent valve in said connection between said input bellows and said zeroing bellows, a valve for transferring the input signal to said proportioning bellows, a valve in said connection between said reset bellows and said repeater tank, a valve for transferring said nozzle back pressure to said last named valve, and a vent valve for said last named nozzle back pressure connection, a group of storage chambers, pneumatic connection means between said repeater tank and each of said storage chambers, means for automatically selectively transferring said pneumatic signals from said repeater tank to said storage chambers through said last named pneumatic connection means, repeater means operatively connected with each of said storage chambers for producing, without signal loss in said chambers, output signals available for output operative action, and a programming system for automatically operating said gas analysis system according to a predetermined schedule.

References Cited in the file of this patent

UNITED STATES PATENTS

| | | |
|---|---|---|
| 2,556,803 | Eckman | June 12, 1951 |
| 2,826,908 | Skarstrom | Mar. 18, 1958 |

OTHER REFERENCES

Oil and Gas Journal, April 16, 1956, page 212.
Canadian Journal of Chemistry, vol. 33, 1956, page 1263, Fig. 3.